(12) United States Patent
Otani

(10) Patent No.: US 8,737,012 B2
(45) Date of Patent: May 27, 2014

(54) SYSTEM AND METHOD FOR AUTOMATIC CALIBRATION OF NOTCH FILTER OF HARD DISK DRIVE

(75) Inventor: Daijiro Otani, Kodaira (JP)

(73) Assignee: Texas Instruments Incorporated, Dallas, TX (US)

( * ) Notice: Subject to any disclaimer, the term of this patent is extended or adjusted under 35 U.S.C. 154(b) by 18 days.

(21) Appl. No.: 13/609,600

(22) Filed: Sep. 11, 2012

(65) Prior Publication Data

US 2014/0063652 A1    Mar. 6, 2014

Related U.S. Application Data

(60) Provisional application No. 61/696,882, filed on Sep. 5, 2012.

(51) Int. Cl.
*G11B 5/596*    (2006.01)

(52) U.S. Cl.
USPC ........................................................ 360/78.04

(58) Field of Classification Search
None
See application file for complete search history.

(56) References Cited

U.S. PATENT DOCUMENTS

| | | | |
|---|---|---|---|
| 6,574,065 B1 * | 6/2003 | Sri-Jayantha et al. | 360/75 |
| 6,930,853 B2 * | 8/2005 | Settje et al. | 360/78.04 |
| 7,016,142 B2 * | 3/2006 | Jung et al. | 360/77.02 |
| 8,132,459 B2 | 3/2012 | Toga et al. | |

* cited by examiner

*Primary Examiner* — K. Wong
(74) *Attorney, Agent, or Firm* — Alan A. R. Cooper; W. James Brady, III; Frederick J. Telecky, Jr.

(57) ABSTRACT

An apparatus for use with a hard disk drive, comprising: a selectable notch filter with a selectable notch frequency; a shock sensor of the hard disk drive, coupled to the selectable notch filter, the shock sensor having at least one resonance frequency; a flip flop coupled to an output of the notch filter and an output of the shock sensor; a calibration logic coupled to an output of the flip flop, wherein an output of the calibration logic is coupled to a selection input of the selectable notch filter.

20 Claims, 19 Drawing Sheets

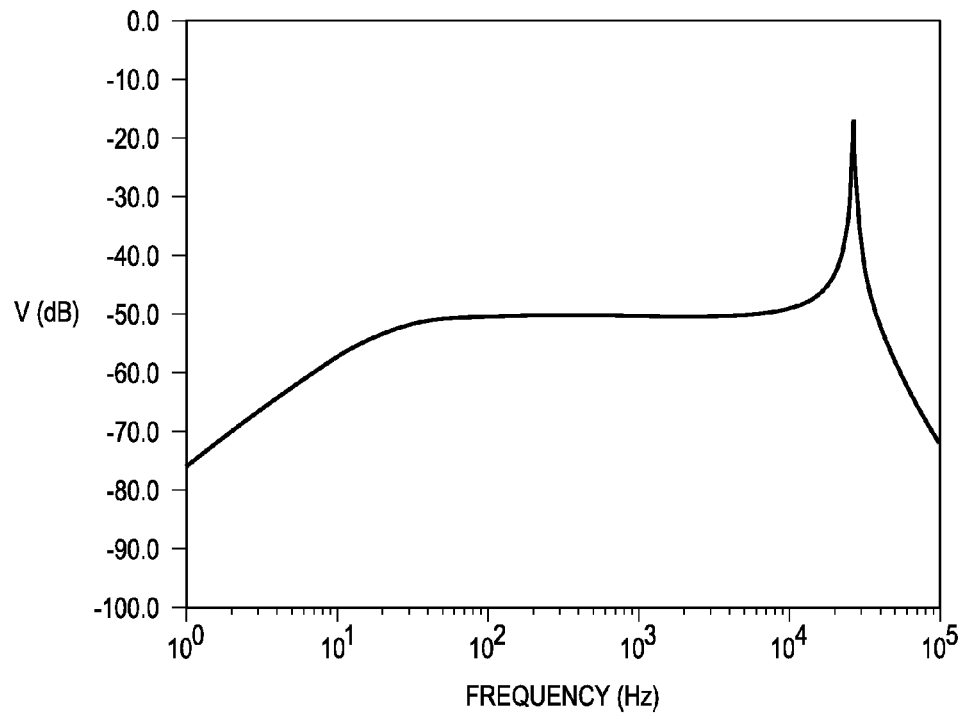
FIG. 1Bi
(PRIOR ART)
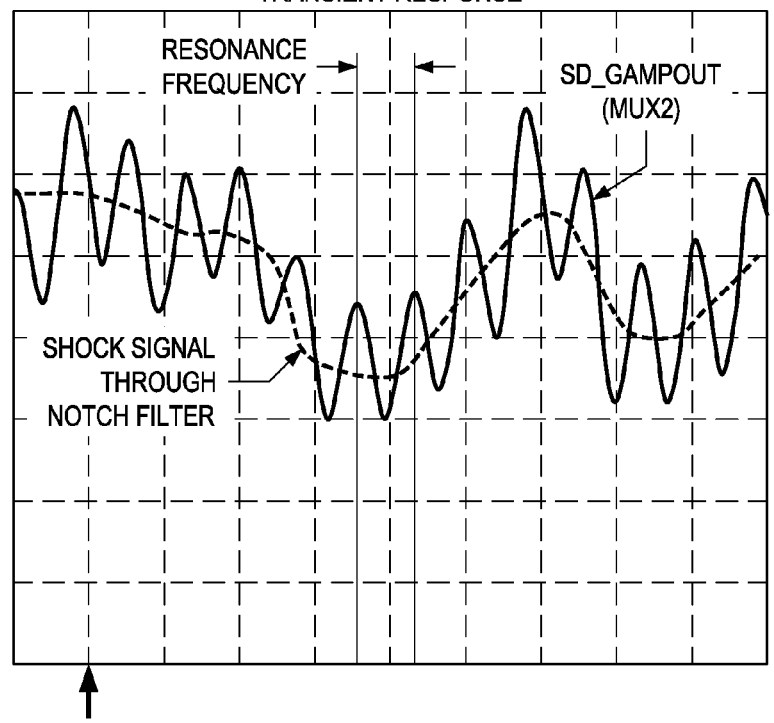
FIG. 1Bii
(PRIOR ART)

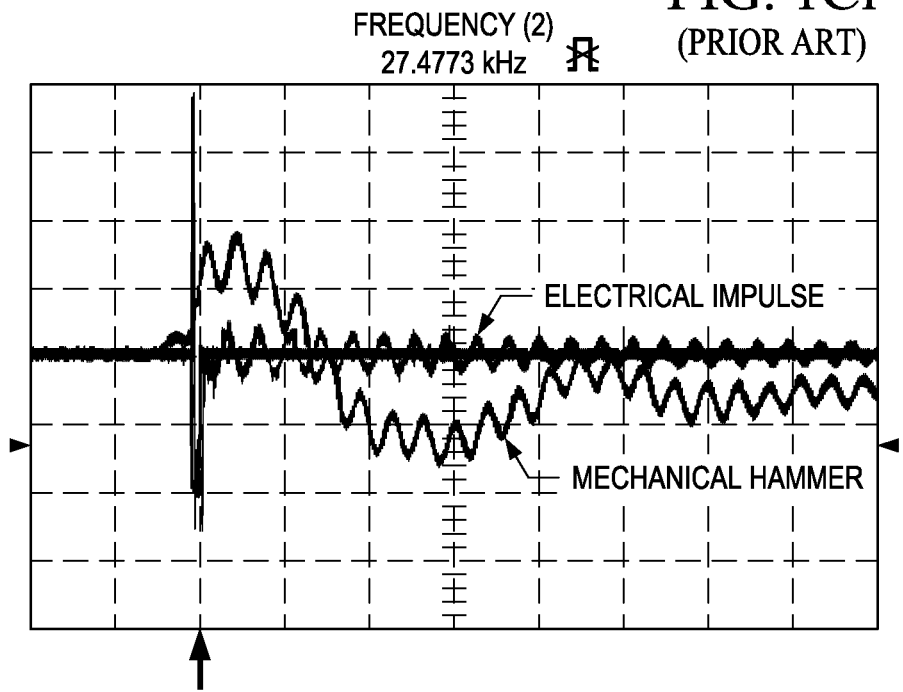
FIG. 1Ci
(PRIOR ART)
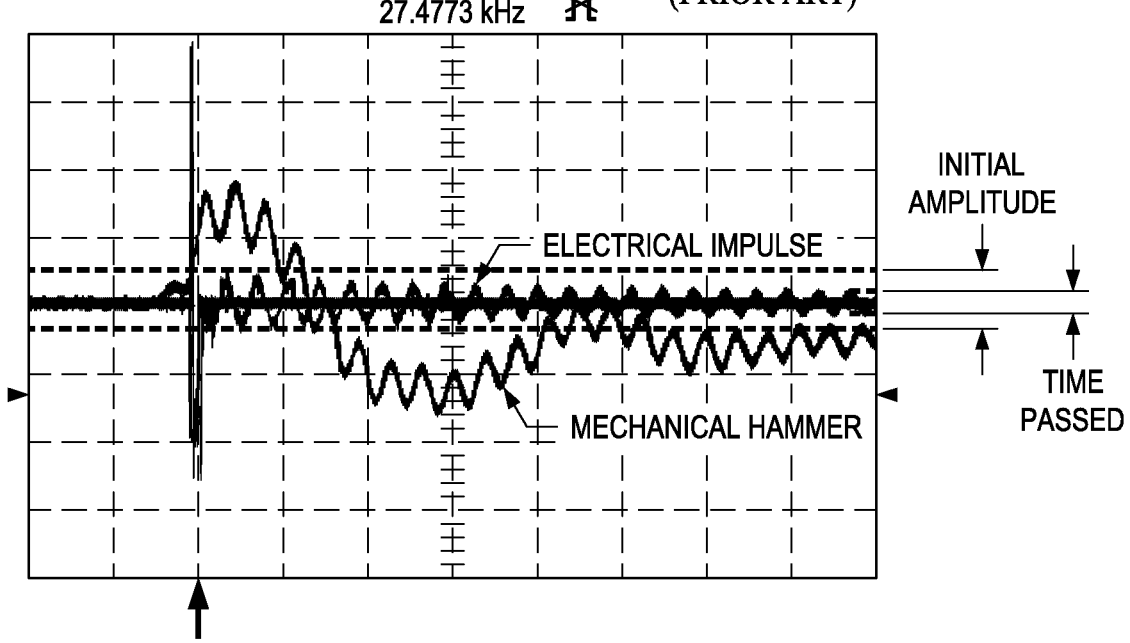
FIG. 1Cii
(PRIOR ART)

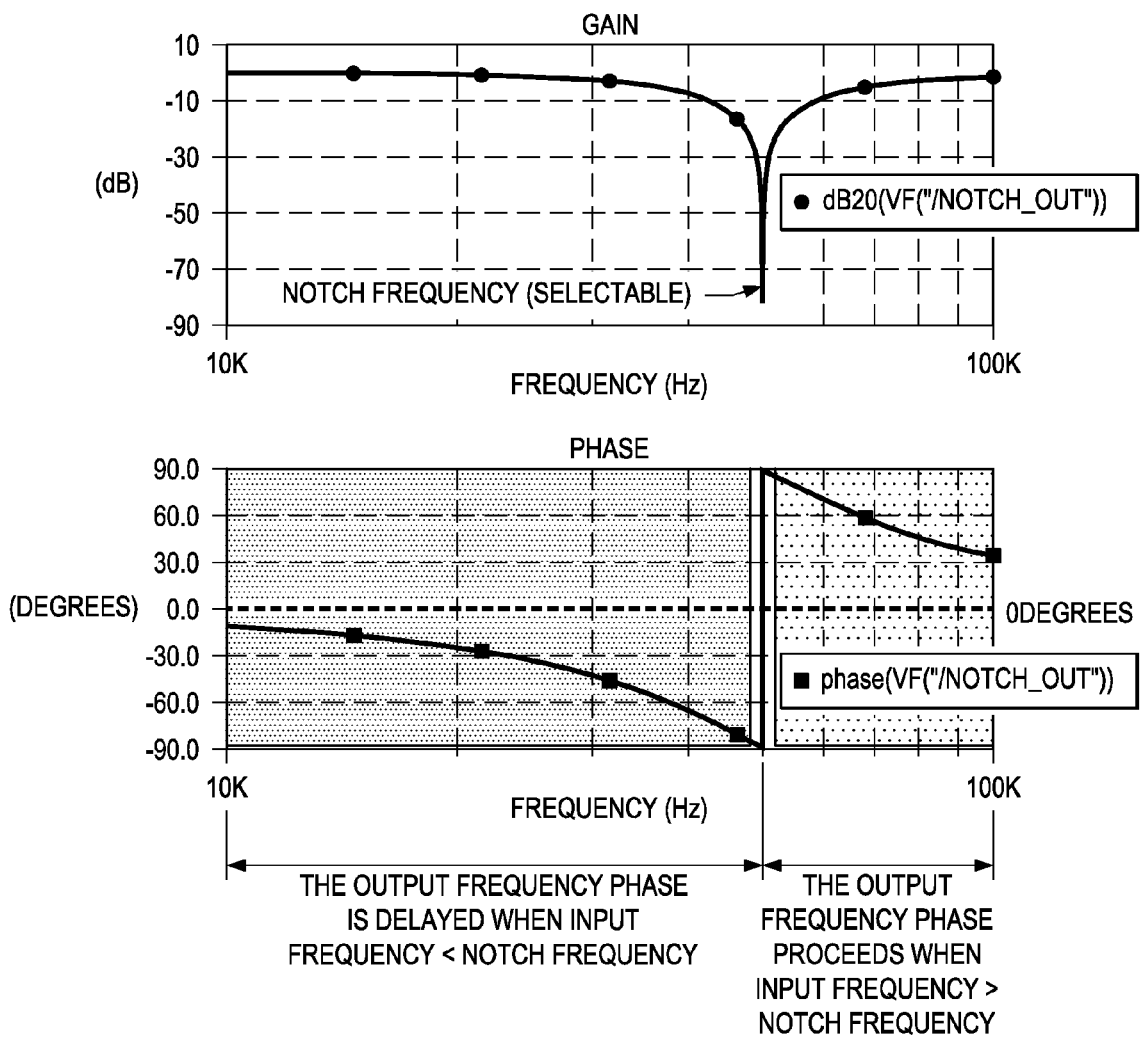

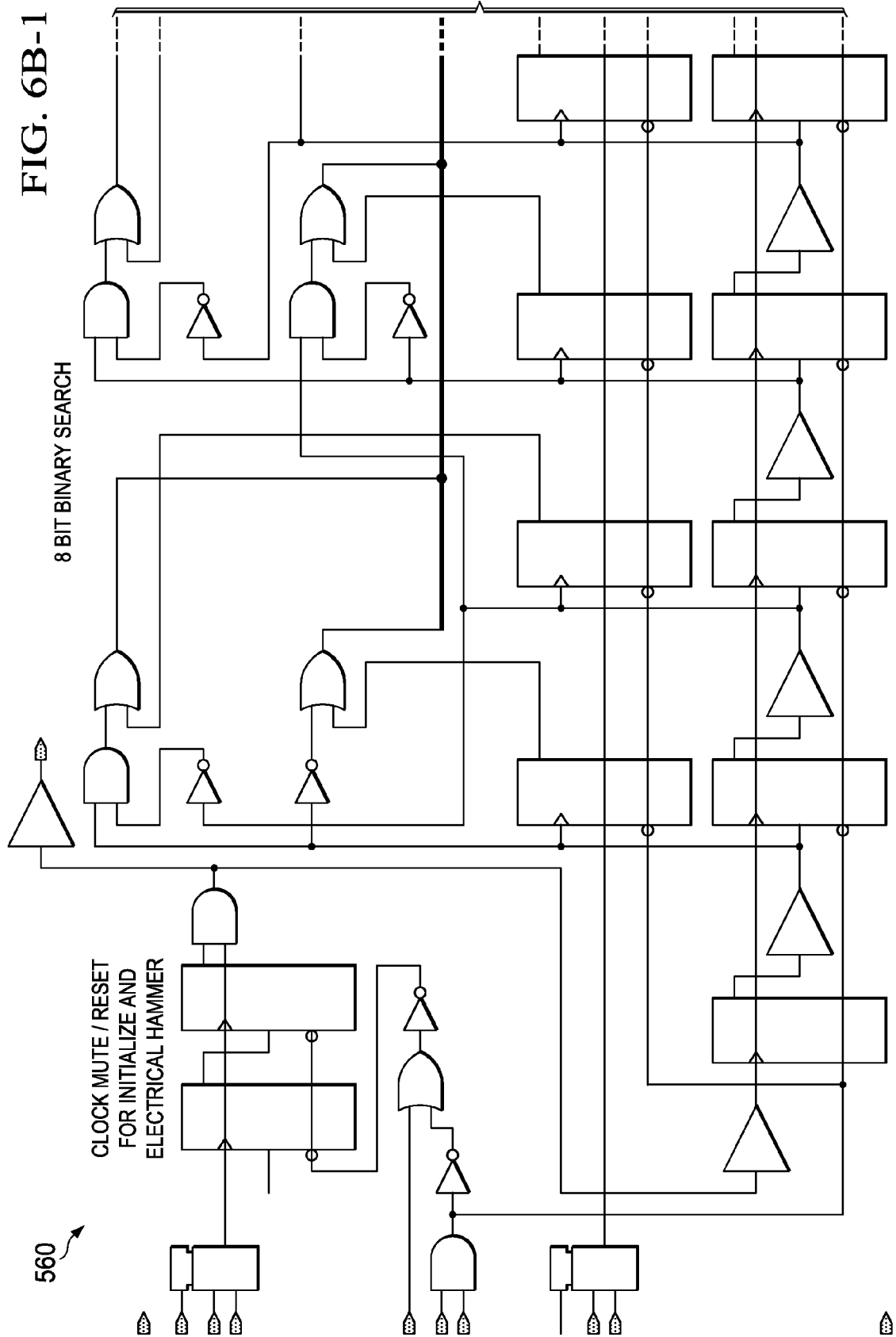

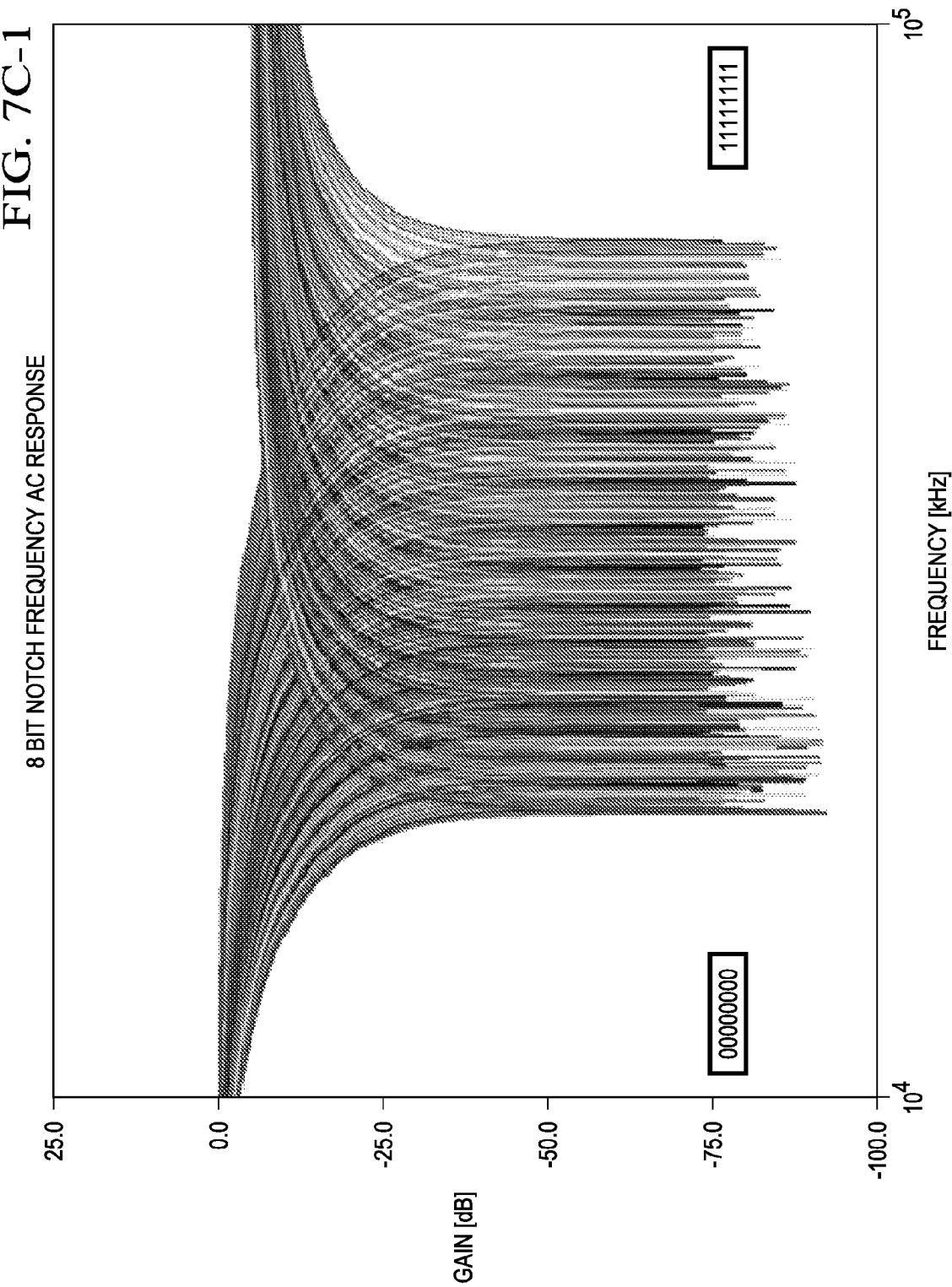

FIG. 7C-2

8 BIT NOTCH FREQUENCY TABLE [kHz]

| SHK | | LSB 4bit | | | | | | | | | | | | | | | |
|---|---|---|---|---|---|---|---|---|---|---|---|---|---|---|---|---|---|
| | | 0000 | 0001 | 0010 | 0011 | 0100 | 0101 | 0110 | 0111 | 1000 | 1001 | 1010 | 1011 | 1100 | 1101 | 1110 | 1111 |
| MSB 4bit | 0000 | 18.38 | 18.44 | 18.49 | 18.54 | 18.59 | 18.64 | 18.70 | 18.75 | 18.80 | 18.86 | 18.91 | 18.96 | 19.02 | 19.07 | 19.13 | 19.18 |
| | 0001 | 19.24 | 19.29 | 19.35 | 19.41 | 19.46 | 19.52 | 19.58 | 19.64 | 19.70 | 19.75 | 19.81 | 19.87 | 19.93 | 19.99 | 20.05 | 20.11 |
| | 0010 | 20.17 | 20.24 | 20.30 | 20.36 | 20.42 | 20.49 | 20.55 | 20.61 | 20.68 | 20.74 | 20.81 | 20.87 | 20.94 | 21.01 | 21.07 | 21.14 |
| | 0011 | 21.21 | 21.28 | 21.34 | 21.41 | 21.48 | 21.55 | 21.62 | 21.69 | 21.76 | 21.84 | 21.91 | 21.98 | 22.05 | 22.13 | 22.20 | 22.28 |
| | 0100 | 22.35 | 22.43 | 22.50 | 22.58 | 22.66 | 22.73 | 22.81 | 22.89 | 22.97 | 23.05 | 23.13 | 23.21 | 23.29 | 23.37 | 23.46 | 23.54 |
| | 0101 | 23.62 | 23.71 | 23.79 | 23.88 | 23.97 | 24.05 | 24.14 | 24.23 | 24.32 | 24.41 | 24.50 | 24.59 | 24.68 | 24.77 | 24.86 | 24.96 |
| | 0110 | 25.05 | 25.15 | 25.24 | 25.34 | 25.44 | 25.54 | 25.63 | 25.73 | 25.83 | 25.93 | 26.04 | 26.14 | 26.24 | 26.35 | 26.45 | 26.56 |
| | 0111 | 26.66 | 26.77 | 26.88 | 26.99 | 27.10 | 27.21 | 27.32 | 27.44 | 27.55 | 27.67 | 27.78 | 27.90 | 28.02 | 28.14 | 28.26 | 28.38 |
| | 1000 | 28.50 | 28.62 | 28.74 | 28.87 | 29.00 | 29.12 | 29.25 | 29.38 | 29.51 | 29.64 | 29.78 | 29.91 | 30.05 | 30.18 | 30.32 | 30.46 |
| | 1001 | 30.60 | 30.74 | 30.89 | 31.03 | 31.18 | 31.32 | 31.47 | 31.62 | 31.78 | 31.93 | 32.08 | 32.24 | 32.40 | 32.56 | 32.72 | 32.88 |
| | 1010 | 33.04 | 33.21 | 33.37 | 33.54 | 33.71 | 33.89 | 34.06 | 34.24 | 34.41 | 34.59 | 34.77 | 34.96 | 35.14 | 35.33 | 35.52 | 35.71 |
| | 1011 | 35.90 | 36.10 | 36.30 | 36.50 | 36.70 | 36.90 | 37.11 | 37.32 | 37.53 | 37.74 | 37.96 | 38.18 | 38.40 | 38.62 | 38.85 | 39.08 |
| | 1100 | 39.31 | 39.54 | 39.78 | 40.02 | 40.26 | 40.51 | 40.76 | 41.01 | 41.27 | 41.52 | 41.79 | 42.05 | 42.32 | 42.59 | 42.87 | 43.15 |
| | 1101 | 43.43 | 43.71 | 44.00 | 44.30 | 44.60 | 44.90 | 45.20 | 45.51 | 45.83 | 46.15 | 46.47 | 46.80 | 47.13 | 47.47 | 47.81 | 48.16 |
| | 1110 | 48.51 | 48.87 | 49.23 | 49.60 | 49.97 | 50.35 | 50.74 | 51.13 | 51.53 | 51.93 | 52.34 | 52.76 | 53.18 | 53.61 | 54.05 | 54.49 |
| | 1111 | 54.94 | 55.40 | 55.87 | 56.34 | 56.82 | 57.32 | 57.82 | 58.32 | 58.84 | 59.37 | 59.90 | 60.45 | 61.01 | 61.57 | 62.15 | 62.74 |

00001111 → 1111 column top
00000000 → 0000 column, 0000 row
11110000 → 1111 row, 0000 column
11111111 → 1111 row, 1111 column MSB4bit INCREMENT
LSB4bit INCREMENT

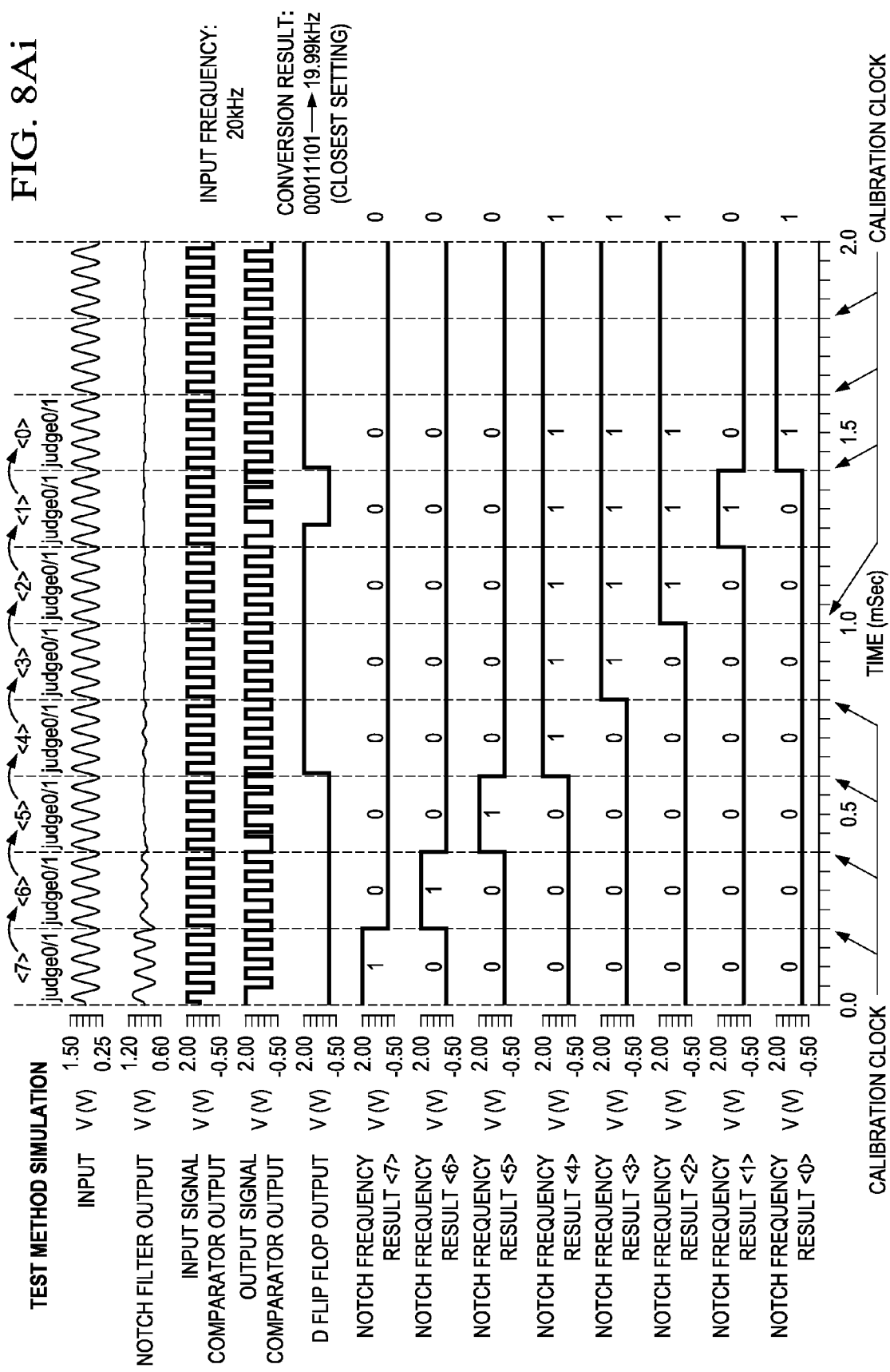

FIG. 8Aii   20kHZ CALIBRATION BINARY SEARCH PROCESS

THE SEQUENTIAL CALIBRATION STARTS FROM MSB

1. AT <7> JUDGE, SET NOTCH FREQUENCY TO 10000000 (28.50kHz, 128TH FREQUENCY SETTING OUT OF 256 SETTINGS)
2. SINCE DFF RESULT IS 0 AT THE EDGE OF CALIBRATION CLOCK, ← SET 0 AS 28.50kHz IS HIGHER THAN 20kHz
3. AT <6> JUDGE, SET NOTCH FREQUENCY TO 01000000 (22.35kHz)
4. SINCE DFF RESULT IS 0 AT THE EDGE OF CALIBRATION CLOCK, ← SET 0 AS 22.35kHz IS HIGHER THAN 20kHz
5. AT <5> JUDGE, SET NOTCH FREQUENCY TO 00100000 (20.17kHz)
6. SINCE DFF RESULT IS 0 AT THE EDGE OF CALIBRATION CLOCK, ← SET 0 AS 20.17kHz IS HIGHER THAN 20kHz
7. AT <4> JUDGE, SET NOTCH FREQUENCY TO 00010000 (19.24kHz)
8. SINCE DFF RESULT IS 1 AT THE EDGE OF CALIBRATION CLOCK, ← SET 1 AS 19.24kHz IS LOWER THAN 20kHz
9. AT <3> JUDGE, SET NOTCH FREQUENCY TO 00011000 (19.70kHz)
10. SINCE DFF RESULT IS 1 AT THE EDGE OF CALIBRATION CLOCK, ← SET 1 AS 19.70kHz IS LOWER THAN 20kHz
11. AT <2> JUDGE, SET NOTCH FREQUENCY TO 00011100 (19.93kHz)
12. SINCE DFF RESULT IS 1 AT THE EDGE OF CALIBRATION CLOCK, ← SET 1 AS 19.93kHz IS LOWER THAN 20kHz
13. AT <1> JUDGE, SET NOTCH FREQUENCY TO 00011110 (20.05kHz)
14. SINCE DFF RESULT IS 0 AT THE EDGE OF CALIBRATION CLOCK, ← SET 0 AS 20.05kHz IS HIGHER THAN 20kHz
15. AT <0> JUDGE, SET NOTCH FREQUENCY TO 00011101 (19.99kHz)
16. SINCE DFF RESULT IS 1 AT THE EDGE OF CALIBRATION CLOCK, ← SET 1 AS 19.99kHz IS LOWER THAN 20kHz
17. THE CONVERSION RESULT IS OBTAINED AS 00011101 (19.99kHZ)

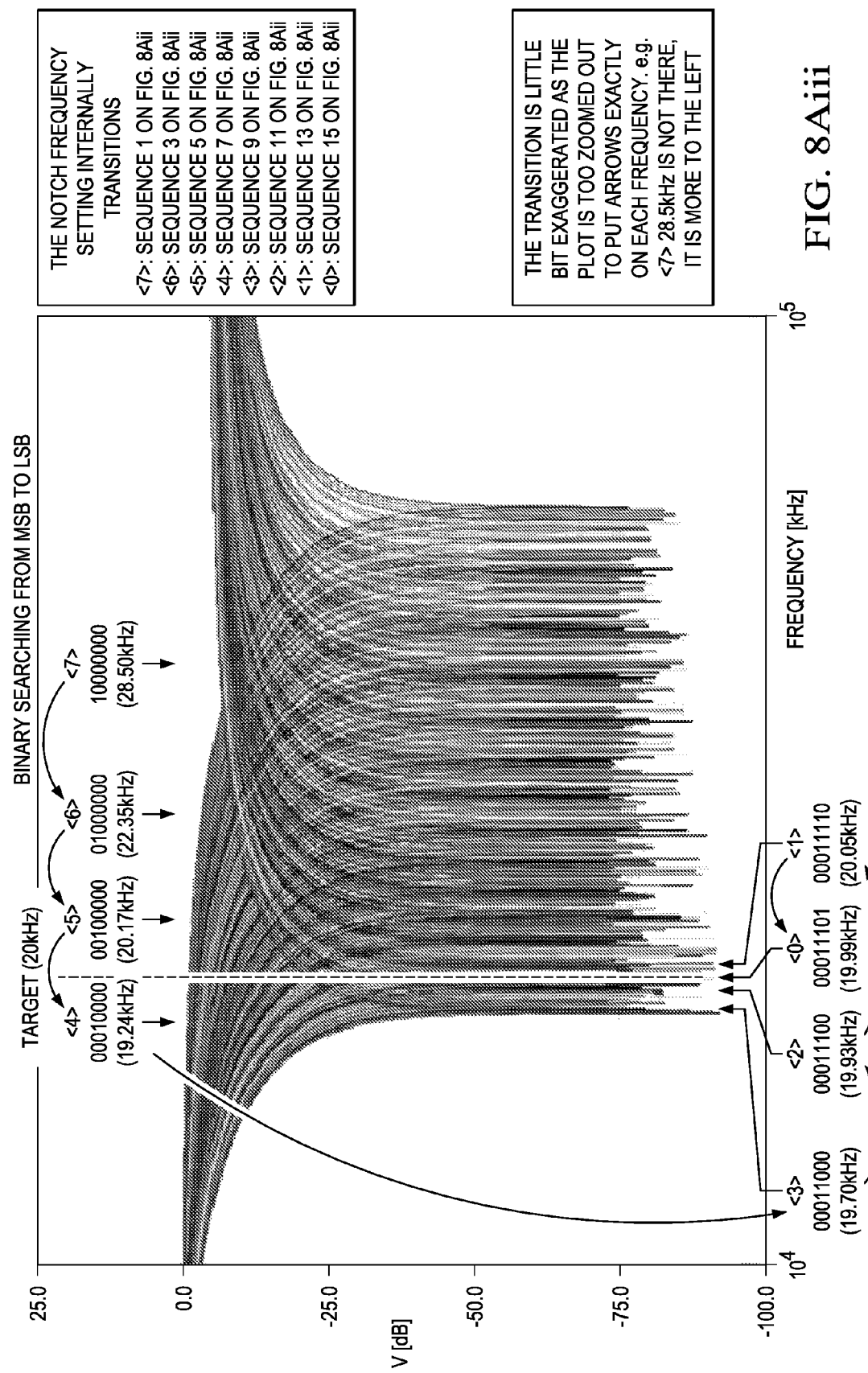
FIG. 8Aiii

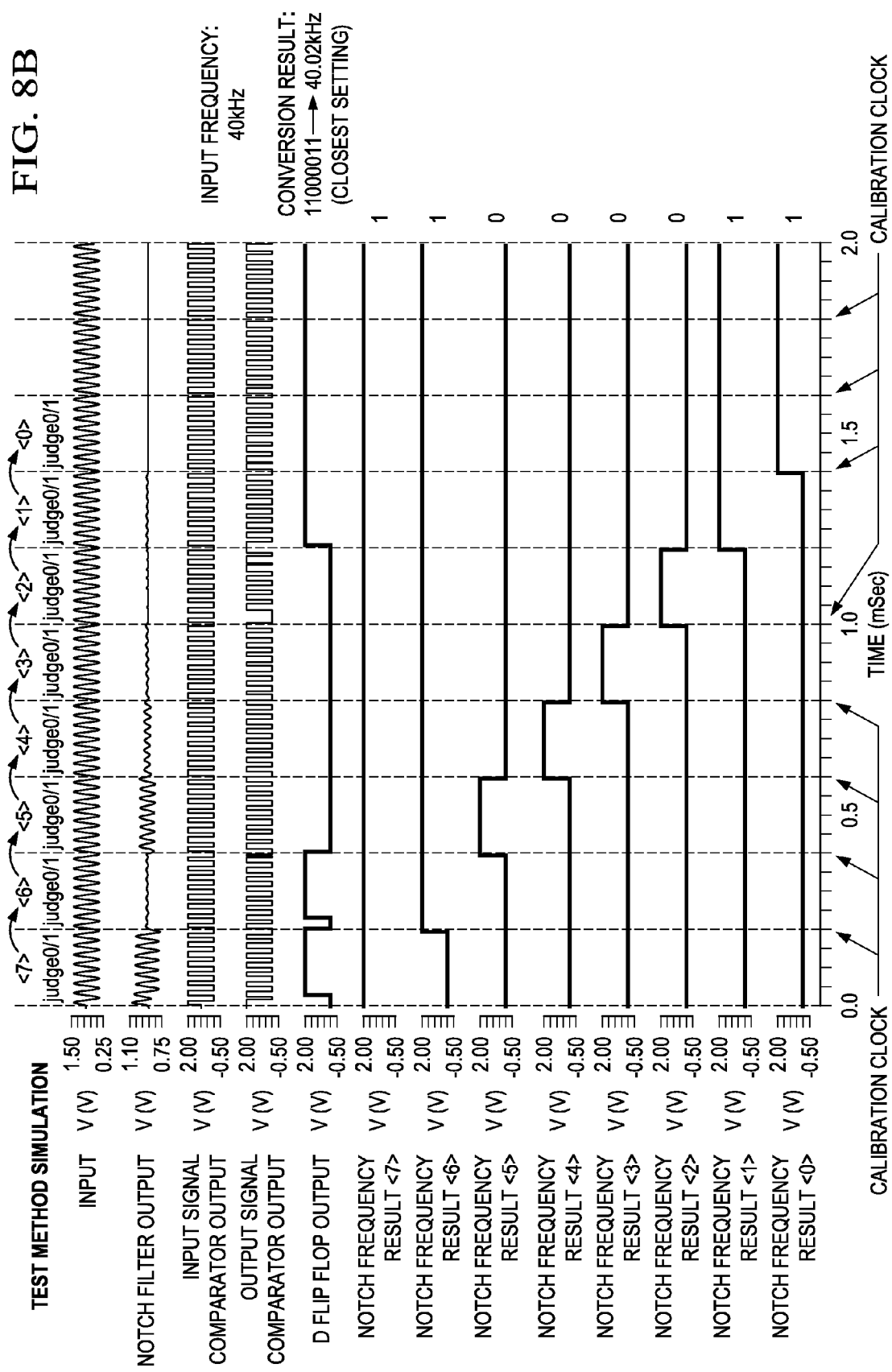

SYSTEM AND METHOD FOR AUTOMATIC CALIBRATION OF NOTCH FILTER OF HARD DISK DRIVE

PRIORITY

This application claims priority to U.S. Provisional Application No. 61/696,882 filed Sep. 5, 2012, entitled "System and Method for Automatic Calibration of Notch Filter of Hard Disk Drive", which is incorporated by reference in its entirety.

TECHNICAL FIELD

This application is directed, in general, to a calibration of a digital filter and, more specifically, to a calibration of a digital filter into a resonance frequency of a shock sensor of a hard disk drive ("HDD").

BACKGROUND

FIG. 1A is directed towards a prior art servo combo driver diagram 100 for a HDD. The diagram 100 includes a shock sensor 110 having a shock sensor 115. The shock sensor 115 has a resonance frequency, which can lay outside of a normal shock signal range. However, a shock has elements of an impulse that resonates at the resonance frequency, thereby creating at least in part a false signal that needs to be accounted for through employment of a notch filter.

FIG. 1Bi is directed towards illustrating an example frequency response of the shock sensor 115. As is illustrated, the shock sensor 115 has a resonance frequency, which can be both within a desired sensor range and outside of a sensor range. However, a shock has elements of an impulse that resonates at the resonance frequency, thereby creating at least in part a false signal that needs to be accounted for through employment of a notch filter.

FIG. 1Bii is directed towards an example prior art shock sensor transient response. As is illustrated, the resonance frequencies are propagated.

The periodic nature of the resonance is determined from the physical structure of the sensor, so when the physical structure (or X, Y, Z sizes) of the sensor varies, the resonance frequency also varies. For one typical sensor used in HDD drive, the resonance frequency is roughly times order of the shock signal (1~3 k Hz signal, 20 k~50 kHz resonance), and the resonance gain is about 30 dB more of the shock signal. Once the sensor receives shock (or hit by something), the shock and resonance signals are input to an IC as the summation of the signals. Both shock signal and resonance signals gradually decays back to zero.

One such example is given in U.S. Pat. No. 8,132,459 to Toga, et al. ("Toga,") entitled "System and Method to Determine Mechanical Resonance of an Accelerometer", hereby incorporated by reference in its entirety. Generally, in Toga, an "electric impulse" is applied to a shock sensor at different frequencies to determine a resonance of the shock sensor, so a notch filter for this resonance can then be applied. However, the "electric impulse" approach can require a number of incremental changes to the notch frequency in order to determine the correct notch filter frequency. Generally, Toga is directed to the generation of the mechanical resonance frequency of a shock sensor by electrically stimulating the sensor.

FIG. 1Ci comparison of an actual behavior of a shock sensor between a mechanical hammer and an electrical impulse. Mechanical hammer: the sensor or the peripheral is mechanically (actually) hit and outputs both the shock and resonance signal. Electrical Impulse: Toga patent for electrically stimulating the sensor and the sensor outputs only the resonance signal.

FIG. 1Cii discloses how, as seen on the impulse and mechanical waveforms, the resonance signal amplitudes generated by impulses decay as time passes, and eventually comes back to steady state.

Generally, Toga uses the electrical impulse approach to generate or pull out the mechanical resonance of a shock sensor. Toga also uses 'zero crossing' of the resonance signal with respect to the reference voltage so that it catches and digitize the resonance signal and it can be measured as a 'time', which can be converted to the frequency (=1/time). However, it does not talk about how to calibrate the notch filter into the resonance frequency. Furthermore, according to Toga, even if it can find the resonance frequency, the notch filter needs absolute tolerance on the frequency settings as it only finds the input frequency.

Therefore, there is a need in the art to address at least some of the issues associated with prior art notch filters for HDDs.

SUMMARY

A first aspect provides an apparatus for use with a hard disk drive, comprising: a selectable notch filter with a selectable notch frequency; a shock sensor of the hard disk drive, coupled to the selectable notch filter, the shock sensor having at least one resonance frequency; a flip flop coupled to an output of the notch filter and an output of the shock sensor; a calibration logic coupled to an output of the flip flop, wherein an output of the calibration logic is coupled to a selection input of the selectable notch filter.

A second aspect provides an apparatus for use with a hard disk drive, comprising: a digital selectable notch filter with a selectable notch frequency; a shock sensor of the hard disk drive, coupled to the digital selectable notch filter, the shock sensor having at least one resonance frequency; a triggerable memory element coupled to an output of the notch filter and an output of the shock sensor; a calibration logic coupled to an output of the flip flop, wherein an output of the calibration logic is coupled to a selection input of the selectable notch filter, wherein the wherein the apparatus is configured to converge upon a digital value of the digital selectable notch filter that substantially filters out the at least one resonance frequency of the shock sensor.

A third aspect provides a method, comprising: generating a resonant frequency of a shock sensor of a hard disk drive; setting an N bit notch frequency value all to a given value; setting a index number to zero; setting a most significant bit minus the index number to a value opposite of the given value; determining if a D flip flop outputs a one value, if not, resetting the most significant bit minus the index number to zero, wherein the output represents delay or a procession of a phase of an output of the N bit notch filter, when compared to the generated resonant frequency value of the shock sensor used as a clock signal to the D flip flop; incrementing the index number; and determining whether all elements of the N bit notch frequency filter have been set, if not setting the MSB minus the incremented index number to zero. In some aspects, a shock sensor signal is an electronic charge, so a charge amplifier is employed to convert the signal to voltage level.

BRIEF DESCRIPTION OF THE DRAWINGS

Reference is now made to the following descriptions:

FIG. 1Bi illustrates an example frequency response of a shock sensor 115;

FIG. 1Bii illustrates an example prior art shock sensor transient response;

FIG. 1Ci illustrates a comparison of an actual behavior of a shock sensor between a mechanical hammer and an electrical impulse;

FIG. 1Cii illustrates a comparison of the mechanical hammer and electrical impulse waveforms, wherein the resonance signal amplitudes generated by impulses of either approach decay as time passes, and eventually comes back to steady state;

FIG. 7C is an 8 bit frequency selectable notch filter which is used on the simulation;

FIG. 8Ai illustrates a conversion of a simulated resonance frequency of a sensor to a closest notch frequency that substantially cancels the resonance frequency of 20 kHZ as output of the notch of FIG. 5;

FIG. 8Aii illustrates a chart of an example conversion of FIG. 8Ai;

FIG. 8Aiii illustrates the transition of the notch filter frequency setting as the calibration proceeds from the MSB bit to LSB bit in the case of 20 kHz input frequency. This is how the notch is calibrated according to FIG. 7B and FIG. 8Aii;

FIG. 8B illustrates a conversion of a simulated resonance frequency of a sensor to a closest notch frequency that substantially cancels the resonance frequency of 40 kHZ as output of the notch of FIG. 5;

DETAILED DESCRIPTION

Figure 6A:
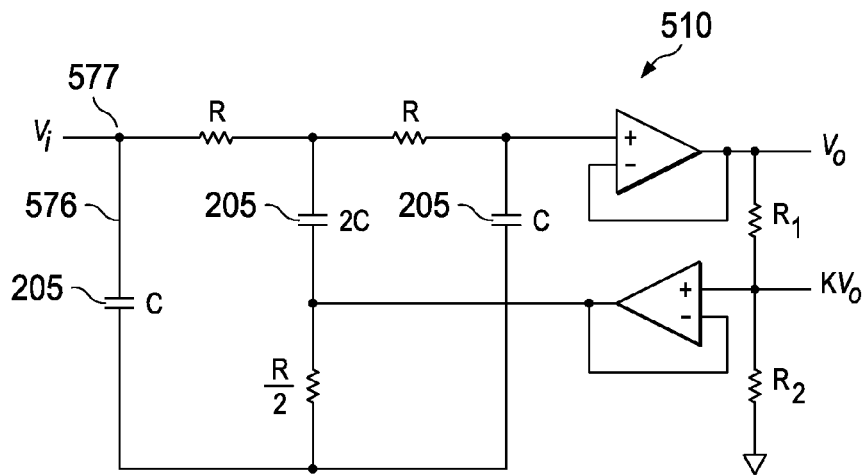
FIG. 6A is an illustration of a notch filter 510 that can be used with the circuit of FIG. 5.
Figures 2, 6B:
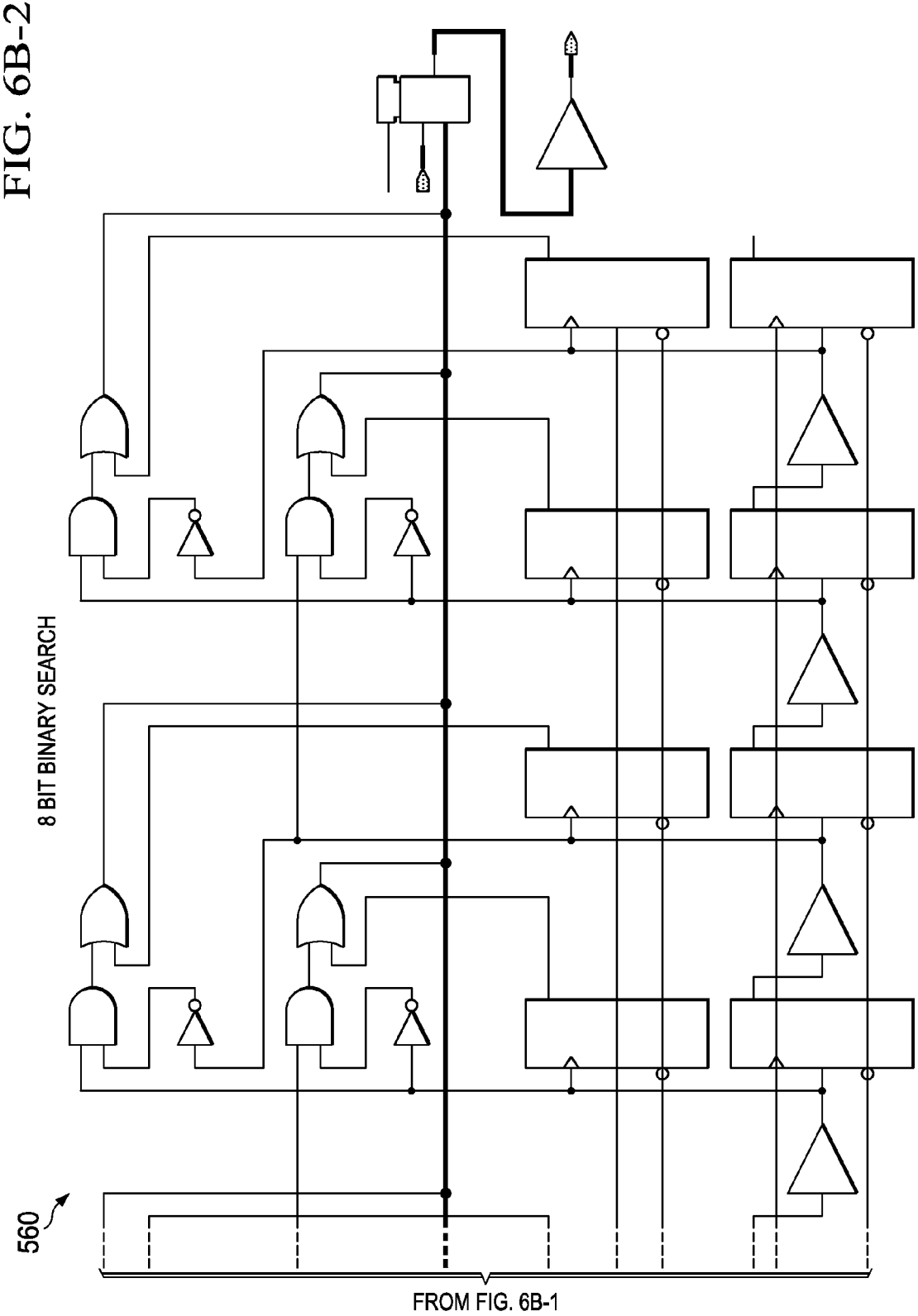
FIG. 2 illustrates an AC characteristic of a notch filter for a HDD employed according to the principles of the present disclosure.
FIG. 6B represents an example calibration logic 560 of FIG. 5.

FIG. 2 illustrates a calibration approach of a notch filter, such as a digital notch filter, constructed according to the principles of the present application. However, the filter can be either analog or digital, as long as it holds the notch characteristics.

The present inventors recognized that, in a context a notch filter employed with shock sensor of a HDD system, that a phase delay of the notch filter can be employed to determine a match between the resonance frequency of the shock sensor of the HDD and the notch frequency, as opposed to the prior art, wherein a magnitude of the transfer function between the shock sensor of the HDD system and the notch filter.

In other words, within the context of the HDD resonance cancellation system, the notch filter is being employed in a new manner when compared to prior art employments of notch filters in the context of prior art HDD resonance cancellation systems. This also leads to other further advantages, as shall be described in more detail below.

In a further aspect, principles of the present application employs Toga's "Electrical Impulse" approach to generate the mechanical resonance frequency of a shock sensor. Once the resonance is generated as a unique input frequency to a notch filter, then the frequency selectable notch filter can be calibrated into the resonance frequency by using phase comparisons employed in this application.

One advantage of the present application is that, as long as the process or manufacturing variation of the notch filter frequency covers the manufacturing variation of the sensor frequency, the absolute frequency tolerance on each notch frequency setting is not necessarily accurate to the target frequency.

Figure 7A:
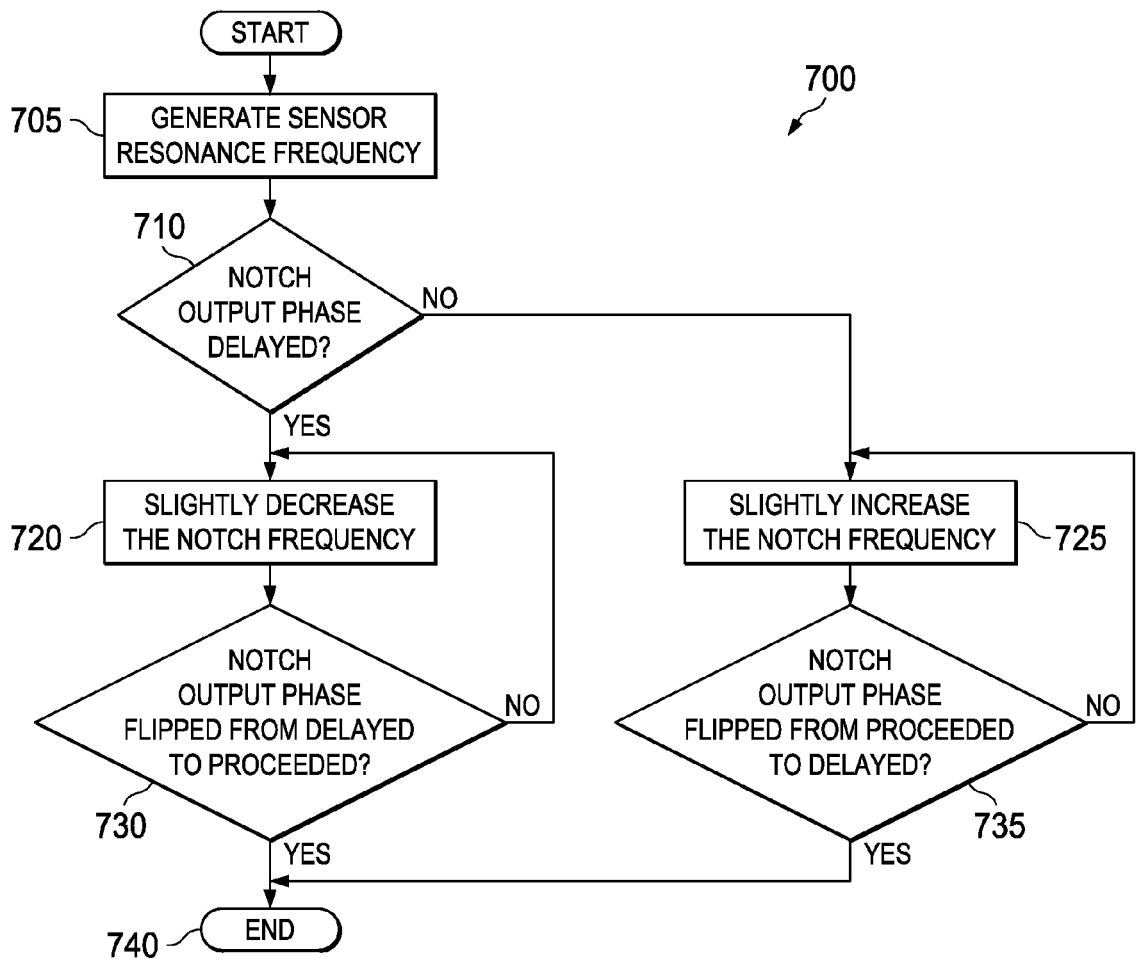
FIG. 7A is a general flow chart of a first method to detect proceeding and delaying phase characteristics of a notch filter of a HDD according to the principles of the present disclosure.

Moreover, incremental comparison also can be applied until DFF output polarity flips, as on FIG. 7A, but it is time consuming compared to the binary searching. Advantageously, binary searching can be employed with the present approach, unlike prior art amplitude checking, as the new approach does not have to check on each frequency setting.

As is illustrated, a notch filter, such as a digital notch filter, has a selectable notch filter. When an input frequency into the notch filter is less than the notch frequency of the notch filter, the output phase of the signal is delayed when compared to the input of the signal. In other words, the output signal phase is delayed from the input signal phase. Alternatively, when an input frequency into the notch filter is greater than the notch frequency of the notch filter, the output phase of the signal is progressed when compared to the input of the signal. The output signal phase is progressed from the input signal phase.

According to the principles of the present application, an output phase of an HDD notch filter is compared to an input phase of the HDD notch filter, and it is determined whether the selectable notch frequency is higher than a resonance frequency of a shock sensor, lower than the resonance frequency, or substantially similar.

Also, please note that in some aspects of a notch filter, the phase difference is at most $\pi/2$.

Figure 1A:
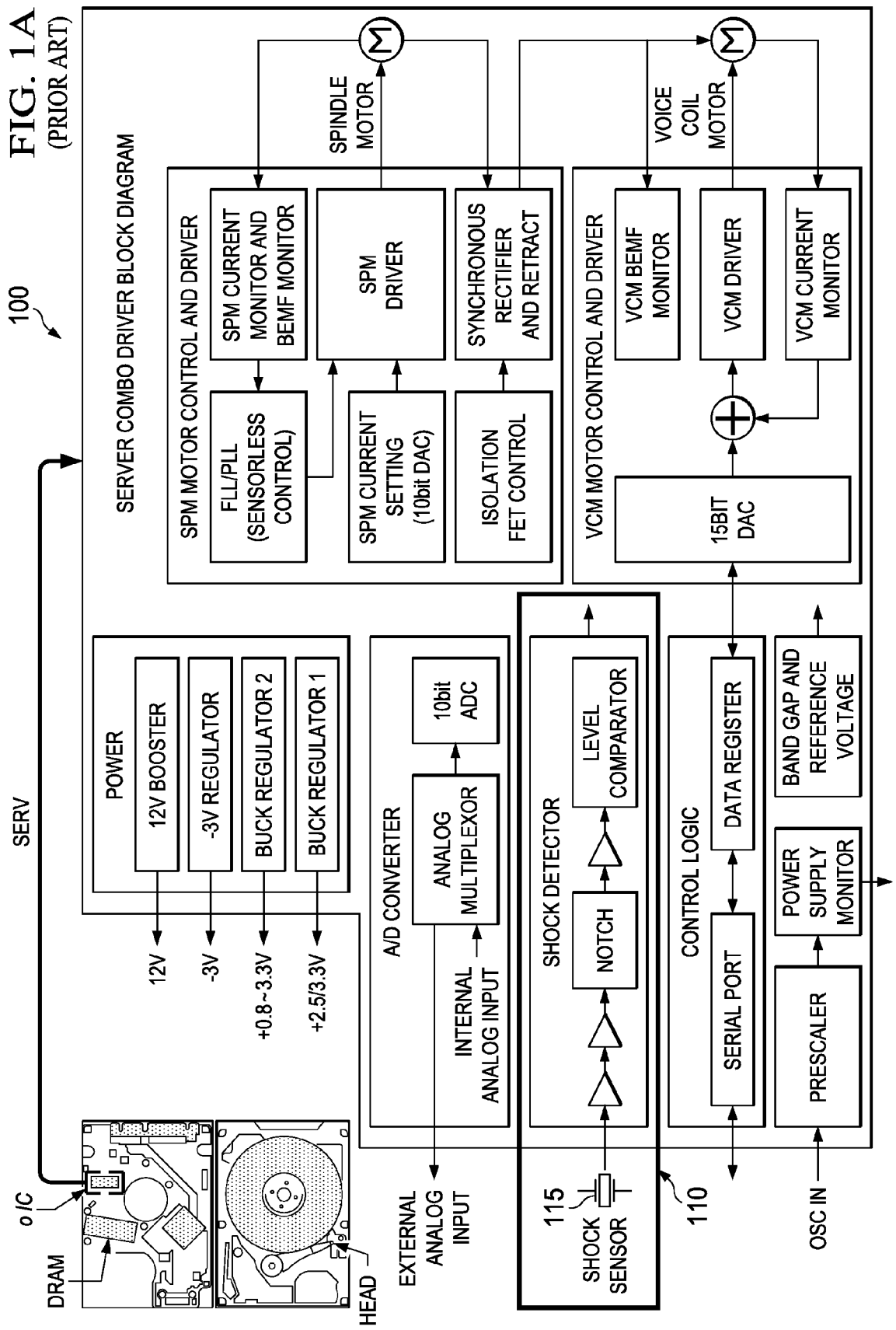
FIG. 1A illustrates is directed towards a prior art servo combo driver diagram 100 for a HDD.
Figure 3:
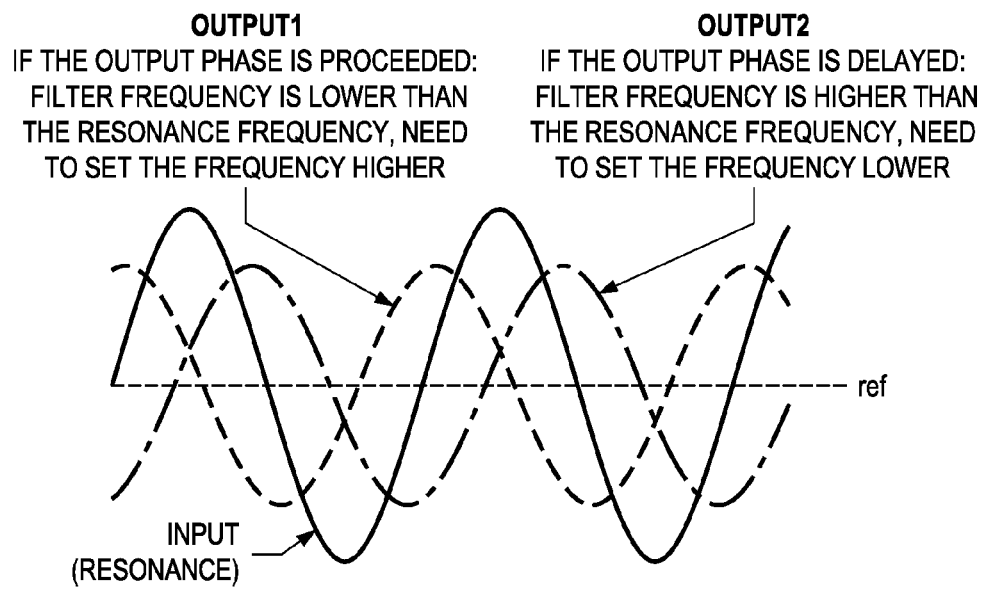
FIG. 3 is an example of a phase delay and a phase proceeding of a HDD waveform when conveyed through a notch filter employed according to the principles of the present disclosure of the present disclosure.

The phase difference is at most $\pi/2$ is for '$2^{nd}$ order' notch filter in the illustrated circuit. If the order of notch is $4^{th}$ order, then the phase delay/proceed will be at most '$\pi$', then this will theoretically be the maximum order that this circuit functions FIG. 3 illustrates an example of a phase delay and a phase proceeding of a HDD waveform when conveyed through a resonance notch filter employed according to the principles of the present disclosure.

As is illustrated, if the output phase is phase proceeded, the notch filter frequency is lower than the resonance frequency, so therefore set the notch frequency higher. However, if the output phase is delayed, the filter frequency is here higher than the resonance frequency, so therefore set the notch frequency lower.

Figure 4:
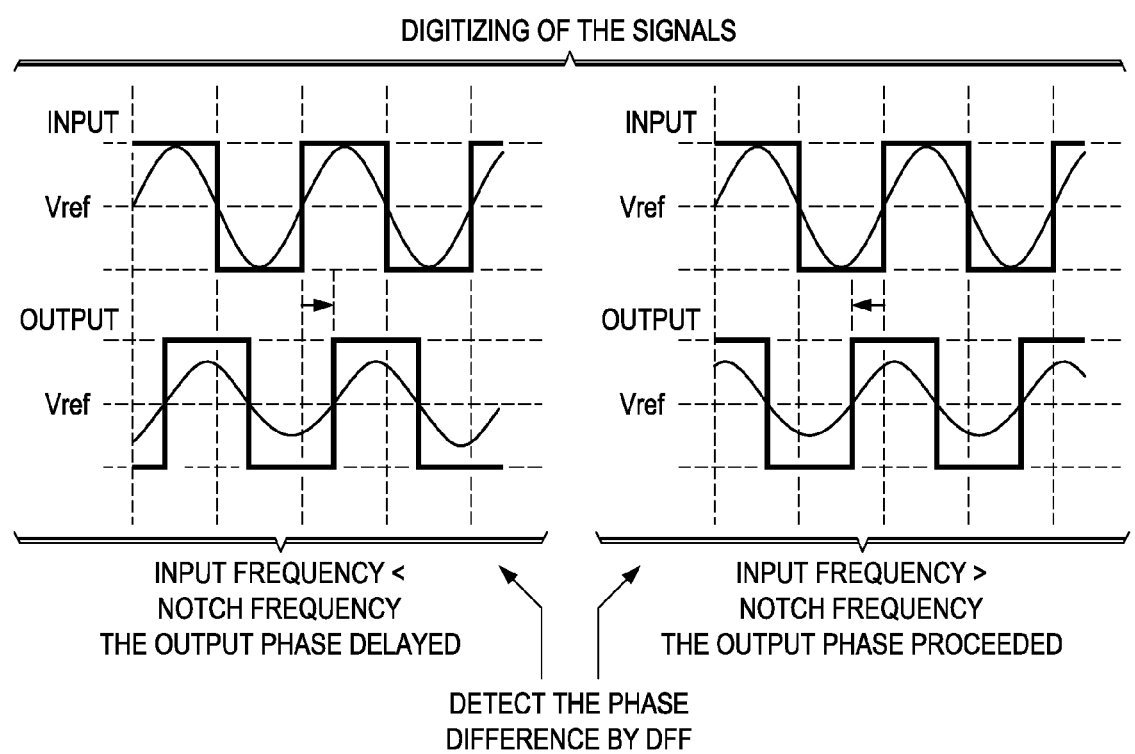
FIG. 4 is an example of a detection of a phase difference by a D-type flip flop of signals of a HDD according to the principles of the present disclosure; therefore, the phase delay/proceed of the digitized input and output of a notch filter can be detected by DFF.

FIG. 4 is an example of a detection of a phase difference, such as may be used with a D-type flip flop (DFF), of signals of a HDD according to the principles of the present disclosure. The notch filter can be any order less than $4^{th}$, wherein a resonance input is given to the D flip flop.

The principles of the present disclosure apply this understanding in a context of HDD frequency selectable notch filter. The present disclosure employs the principle of using the phase gain or the phase lag to determine a difference between a resonance frequency of a shock sensor and a selectable notch filter, such as a selectable notch filter, wherein the filter part can be either digital or analog.

Figure 5:
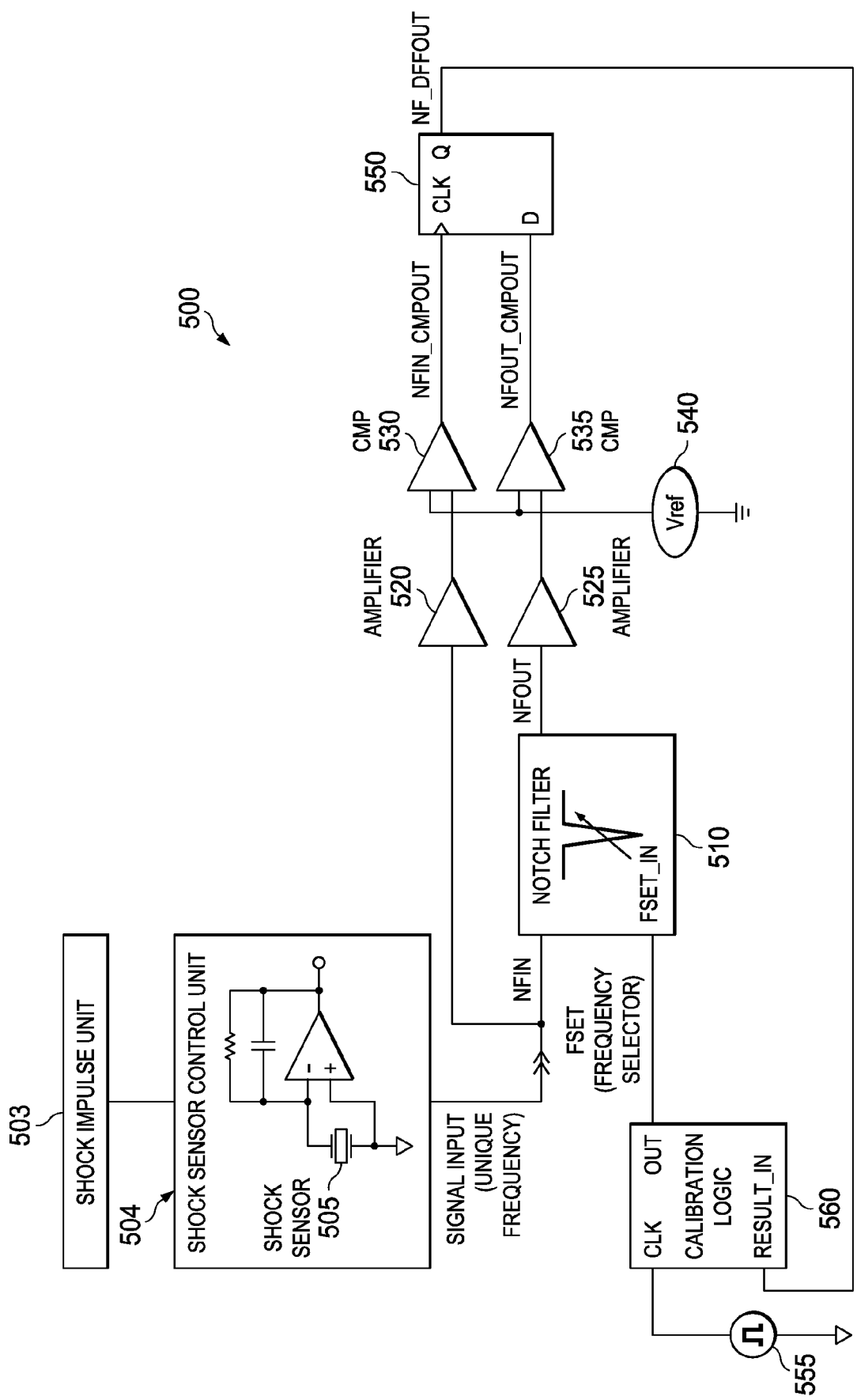
FIG. 5 is an illustration of a block diagram of circuit for employing proceeding and delaying phase characteristics of a notch filter of a HDD according to the principles of the present disclosure.

FIG. 5 is an illustration of a circuit for employing proceeding and delaying phase characteristics of a notch filter of a HDD 500 according to the principles of the present disclosure.

A signal is input into the circuit 500, such as from an HDD shock sensor 505. This signal is or represents a resonance frequency of a HDD shock sensor. This HDD shock sensor resonance frequency shock signal is typically unknown, although for ease of illustrations, known signals will be employed in FIG. 8Ai-9 to illustrate convergence to a given selectable notch filter frequency. Sensor resonance frequency has a typical value and the distributions (tolerance) with its manufacturing process. However, the input frequency is unique; it is not a summation of various frequencies. In the HHD, typically the shock sensor signal is electronic charge, so a charge amplifier is required to convert the signal to voltage level.

The input signal is conveyed to a notch filter 510 with a selected notch filter frequency. The input signal is also conveyed to an amplifier 520, an output of which is then conveyed to a comparator 530 that compares the amplified signal to a threshold voltage Vref 540, which can be ground, but will typically have a negative supply for a symmetrical signal input waveform. A high or low output and/or transition generated by the CMP 530 is then conveyed into the clock input of a triggerable memory element, such as DFF 550. Therefore, the DFF 550 is clocked by the input signal, a resonance frequency of the shock sensor of a HDD. In one preferred embodiment, the Vref 540 is 900 mV, with a dynamic range of the amplifiers 520, 525 having a dynamic range that is +/−700 mV with respect to this reference voltage (=200 mV to 1.6 V.)

And as seen turning back briefly to FIG. 4, not only the comparators 530 & 535, but also the input signal, the notch output signal, and amp 520 and 525 outputs are also outputting the signals with respect to Vref 540 all the analog signals are functioning with respect to Vref, while the digital signals (NFIN_CMPOUT, NFOUT_CMPOUT, NF_DFFOUT, CLK 555, and FSET (8 bit)) are functioning between 0 to 1.8V with the 0/1 threshold at 900 mV.

An output having either a leading or lagging phase is output from the notch filer 510 through NFOUT into the amplifier 525, which is also output into the comparator 535. This compared progressed or delayed output is then conveyed into the D input of the DFF 550. The delayed or progressed input is then clocked by the DFF 550, and the clocked output of the DFF 550 is then conveyed to a coupled calibration logic 560.

The calibration logic 560 received a CLK pulse from a clock 555, and the result, whether a one or a zero, results in whether a binary value output by the calibration logic is a one or a zero, which corresponds to a given frequency value. This is then output by the FSET, which is used to change a calibration frequency of the notch filter 510, thereby bring the selected notch filter frequency closer to the signal input. In the illustrated aspect, FSET is an 8 bit frequency selector.

The output of the D flip flop 550 at least needs to sample each individual bit for the notch filter 510, which is typically at least 1 input frequency cycle +¼ input frequency cycle for the calibration logic 555. Therefore, if the input frequency is 20 kHz, then the circuit 500 needs at least 50 us+12.5 us=62.5 us for each bit of the clock input 555. If the input frequency is unknown or varies, each calibration bit needs at least 1+¼ input frequency cycle of the lowest input frequency assumed for CLK 555. +¼ is for $2^{nd}$ order notch filter. The reason ¼ is required is that the output signal phase is delayed by 90 degrees maximum. In one example, about 3 to 4 frequency cycles are set to ensure the convergence. The calibration logic CLK 555 is slower than 1+¼ and it does not lead to miss reading of DFF.

In the circuit 500, the calibration of the notch filter 510 frequency setting, wherein FSET is 8 bit, is determined sequentially from most significant bit to least significant bit. A calibration of the notch filter occurs every time the clock 555 triggers. Generally, in the circuit 500, by adding the amplifier 520 and comparator 530 before the input signal is connected to D flip flop (DFF), the signal is converted into digital pulse shape, not sine wave anymore, which is easier for DFF to recognize "0" or "1". The output signal of the notch filter 510 also typically needs to be amplified and compared before it is input into DFF 550, since the output signal is attenuated by the notch filter, and the output signal may need to be amplified so the DFF 550 is able to recognize the signal. Otherwise, without amplification, in some aspects, the output signal amplitude may be too small for the DFF to recognize "0" or "1", as the notch filter 510 is calibrated to have a notch that is getting to be close to the input frequency.

In another aspect, the input amplifier 520/comparator 530 help align a propagation delay of the input signal with the filtered output signal. Since the output signal has amplifier 525/comparator 535, the NFOUT signal may be delayed while it passes through these components.

Generally, The phase delay/proceed is determined by the voltage level of DFF 550 output in FIG. 5 as which one of the signals (input or output) crosses the threshold Vref 540 first, but the circuit 500 does not measure 'by how many degrees' the output phase is delayed or proceeded from the input signal phase (it does not need to know). By converting both input and output signals to digital level signals through comparators 530 and 535, and feed the signals to DFF 550, the circuit 500 only let the calibration logic 560 in FIG. 5 know if the output phase is 'delayed' or 'proceeded' from the input phase by the output of DFF 550 by NF_DFFOUT.

A shock sensor control unit 504 is coupled to the shock impulse unit 503. Shock sensor impulse unit 503 is for generating resonance frequency by the electrical impulse function (Toga's). The shock sensor control unit 504 is a shock sensor model and an amplifier called 'charge amplifier'. The piezoelectric shock sensor emits electrons as it receives shock, and the amount of electron emitted is proportional to the shock received. The charge amplifier converts the electron amount to voltage level. The shock sensor itself cannot be directly connected to notch filter or AMP 520, so the shock sensor is coupled to a charge amplifier.

In one example simulation, the voltage level of the resonance frequency generated by the electrical impulse needed to be amplified before it is input into notch filter. Otherwise, the amplitude of the resonance signal becomes too small (fades out) before the calibration is completed, and it leads to a mis-calibration result. An amplifier can be there with the appropriate gain setting (enough amplitude but does not saturate), so if the amplitude of the resonance signal via charge amp is enough, it can be removed or can be just a buffer. The D flip flop 550 output is then conveyed to the calibration logic 560. The circuits 500 functions as the binary searching as on FIG. 7B.

FIG. 6A is an illustration of a notch filter 510 that can be used with the circuit 500. The illustrated notch filter 500 is an analog filter. Notch frequency is selectable by changing the capacitance value by 8 bit (256 values). It is possible to instead change with resistors, if it is designed that way. Generally, as long as the notch filter 510 behaves as a notch filter, and can be less than $4^{th}$ order, in various aspects, the notch filter 510 can be analog RC, digital, switched capacitor type, etc.

FIG. 6B represents an example calibration logic 560 of FIG. 5. This logic behaves as FIG. 7B, and CLK 555 is the trigger to proceed from 775 to 780 or 785. The output is 8 bit notch frequency selector FSET.

Figure 7B:
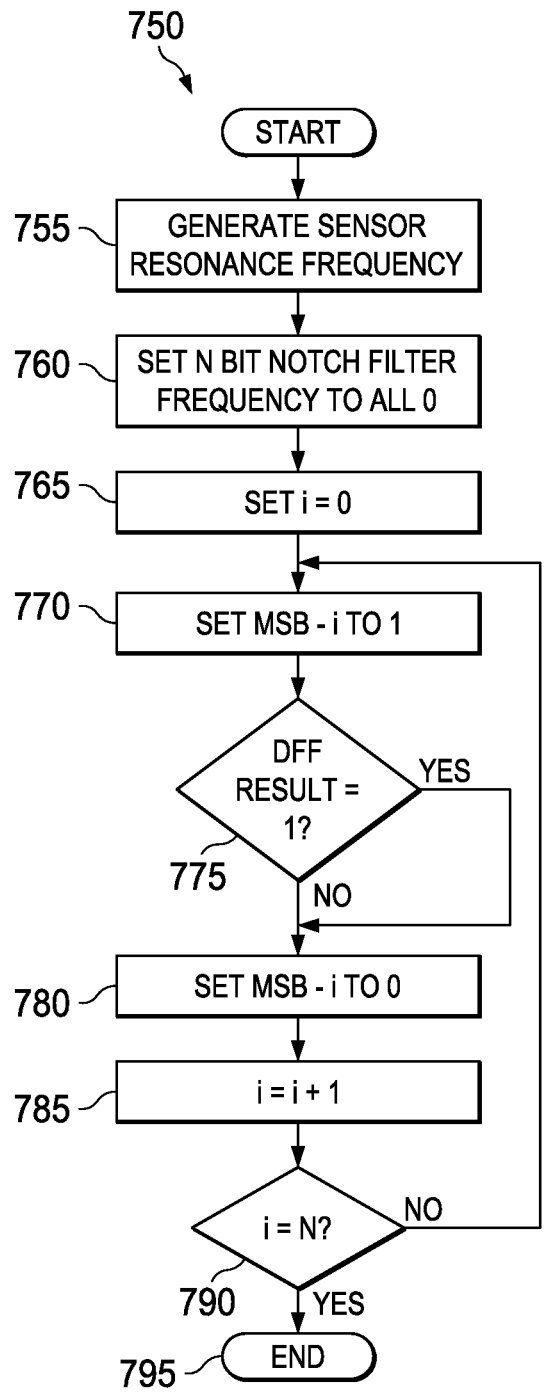
FIG. 7B is a flow chart of a second method that uses binary seeking to detect proceeding and delaying phase characteristics of a notch filter of a HDD according to the principles of the present disclosure.

FIG. 7A illustrates a method 700 for calibrating a notch filter for a resonance frequency of a HDD shock sensor. FIG. 7A illustrates an overall aspect of finding the notch frequency by comparing the phase differences, where the notch frequency is incremented/decremented one-by-one until the DFF output flips. FIG. 7B illustrates particular implementation details with an 'n' bit notch circuit, using a binary search from the MSB.

In a step 705, a sensor resonance frequency of a HDD is generated.

In a step 710, it is determined whether the notch output of the notch filter is phase-delayed. If yes, the method 700 advances, to step 720. If not, the method 700 advances to step 725.

In a step 720, there is a slight decrease in the notch frequency of the notch filter, such as the notch filter 510 of FIG. 5. For example, if a notch filter has a dynamic range of 100 KHz, the notch filter might have a selected notch frequency decreased by 100 Hz.

Alternatively, in a step 725, there is a slight increase in the notch frequency of the notch filter, such as the notch filter 510 of FIG. 5. For example, if a notch filter has a dynamic range of 100 KHz, the notch filter might have a selected notch frequency increased by 100 Hz.

In a step 730, it is determined whether a notch filter output phase is flipped from delayed to proceed. If not, the method returns to step 720. If yes, the method ends in a step 740.

In a step 735, it is determined whether a notch filter output phase is flipped from proceed to delayed. If not, the method returns to step 725. If yes, the method ends in a step 740.

FIG. 7B illustrates an example method 750 for calibrating a resonant notch filter with a shock sensor having a resonance using a binary calibration for a resonance notch filter.

In a step 755, a sensor resonance frequency of a HDD is generated.

In a step 760, an N notch filter has all frequency bits set to "0."

In a step 765, an increment value, such as "i", is also set to "0."

In a step 770, a MSB of the system minus the value of "i" is set to "1."

In a step 775, an output is checked that is derived from the sensor resonance frequency, and phase information that is derived from the comparison of information between the notch filter.

In the step 775, it is determined if the DFF output result is equal to 1. If it is not, the method advances to step 780. If yes, the step advances to step 785. The DFF output is generated according to the principles of the present application, such as discussed in FIG. 5, wherein a preceding or delayed phase is compared to an input phase of signal, such as a resonance frequency of a shock filter, and a value output of D is generated thereby.

In a step 780, the MSB—the value of "i" is set to "0."

In a step 785, the value of "i" is incremented.

In a step 790, it is determined whether the total number of values of the notch filter, typically a digital notch filter, has been determined. If no, the method 700 returns to step 770. If yes, the method 700 ends in a step 795. This is 'N' bit frequency selectable notch filter. For this circuit, it is N=8 bit frequency selectable notch filter, which means this 770 to 785 sequence is performed 8 times.

FIG. 7C illustrates a bode plot wherein the upper portion shows the AC (gain) characteristics of all 8 bit (=256) settings of the notch. Starting from '00000000' setting, the notch frequency is the lowest frequency, while '11111111' setting has the highest frequency setting. The bottom table shows the notch frequency of each of 8 bit (=256) setting. As the table goes from left to right, the notch frequency setting is increased by 1, so the least 4 significant bit increments are shown. As the table goes from top to bottom, the notch frequency setting is increased by 16, so the most 4 significant bit increments are shown. Starting from left upper side, the frequency setting of '00000000' has the notch frequency at 18.38 kHz. By increasing 1 frequency setting (00000001), the notch frequency becomes 18.44 kHz, which is one right number of 18.38 kHz of '00000000'. Going all the way to right bottom number, the notch frequency has 62.74 kHz at '11111111' setting.

FIG. 8Ai illustrates a conversion of a simulated resonance frequency of a shock sensor of a HDD to converge a programmable selectable notch filter to a frequency that substantially cancels the resonance frequency. In the illustration of FIG. 8Ai, this illustrates 20 kHZ inputs and of the D flip flop of FIG. 5.

As is illustrated, the calibration clock 555 makes a transition at cal-clock cycles. At each cycle time, it is determined whether the D flip flop 550 output is high/transitioning high or low/transitioning low. If high/transitioning high, the value is a "1", if low/transitioning low, the value is a "0". These values are then programmed into the programmable notch filter at the next transition edge of clock 555.

In case of 20 kHz input, which results '0001101' for this notch filter, the first 3 most significant bit (MSB)<7>, <6>, and <5> are zeros. This means at each bit comparison stage, the notch frequency setting always gets closer to the target. As a result of getting closer to the target frequency, the output amplitude becomes smaller. At the time <4>, <3>, <2>, <1>, and <0> bits are compared, the notch frequency is already getting close to the target, so the output signal seems very small with the magnification of this graph. Same manner can be applied on 60 kHz case on FIG. 8C that, as '11111010' is the result, the notch frequency are always getting closer to the target as <7>, <6>, <5>, <4>, <3> bit comparison proceeds.

It is possible to generate clock 555 from the input frequency, perhaps through employment of a counter. Once DFF output is fixed according to the phase differences, it holds the DFF output in the same state (0 or 1) until the calibration clock comes (or the input decays/vanishes). This is possible because, the input frequency is unique and the notch frequency is also set into one of the frequency selections and this means the input and the output frequency phase difference is constant. The calibration clock is the trigger that checks the DFF result at 775 and let the flow chart proceed to 780 or 785 in FIG. 7B.

FIG. 8Aii illustrates a 20 KHz calibration binary search process of FIG. 8Ai. The chart is a binary search according to FIG. 7B for an 8 bit notch filter having 256 notch frequencies, as on the table in FIG. 7C.

FIG. 8Aiii illustrates an image view of the internal transition of the frequency setting of the notch filter.

FIG. 8B illustrates a conversion of a simulated resonance frequency of a sensor to a closest notch frequency that substantially cancels the resonance frequency of 40 kHZ as of notch filter. In case of 40 kHz input, shown in FIG. 8B, the notch filter output signal sometimes becomes larger during the calibration process. This is because of the binary searching process which frequency setting sometimes goes away from the target frequency and eventually comes back to the closest frequency setting.

Figure 8C:
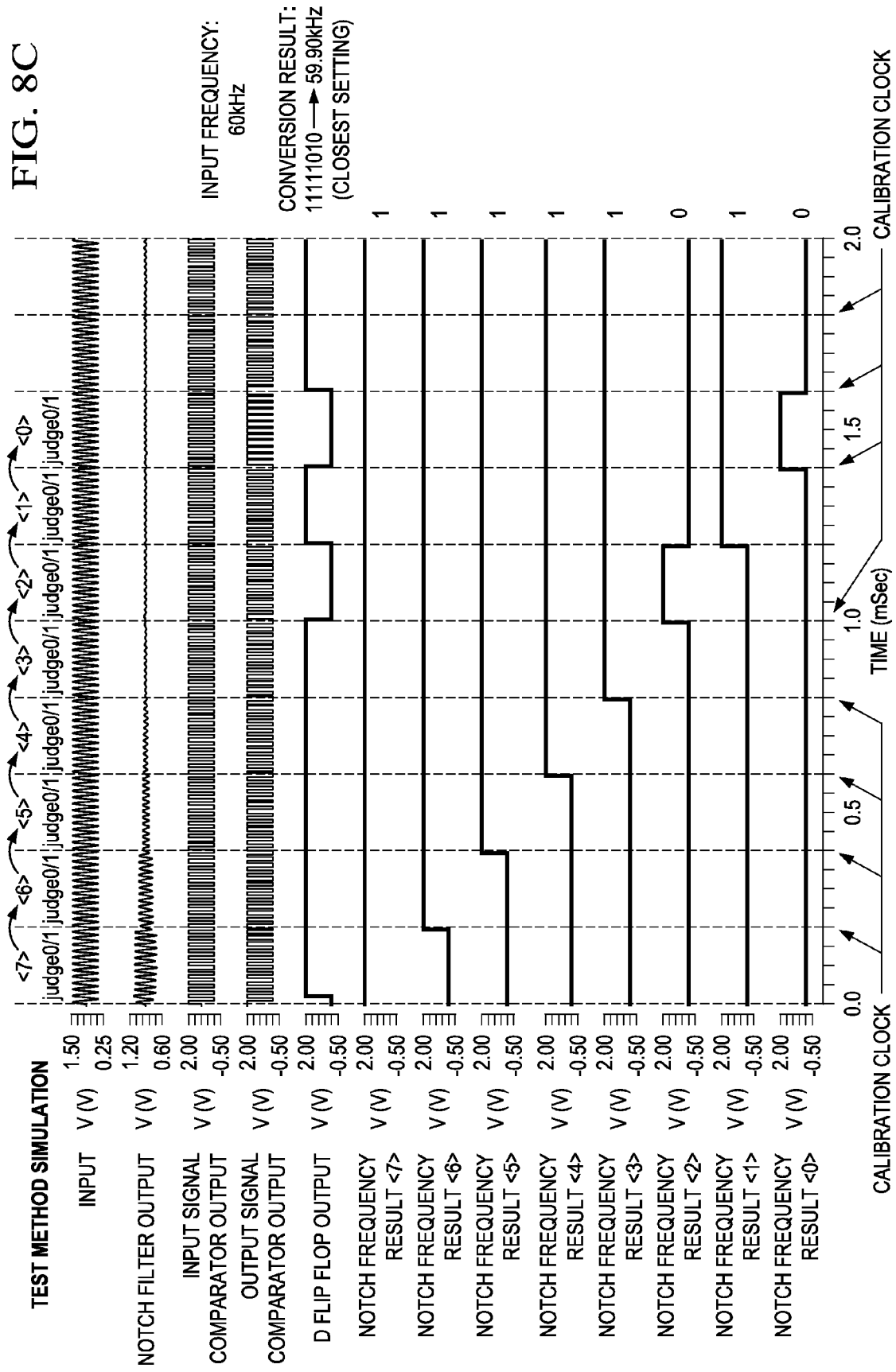
FIG. 8C illustrates conversion of a simulated resonance frequency of a sensor to a closest notch frequency that substantially cancels the resonance frequency of 60 kHZ as output of the notch of FIG. 5.

FIG. 8C illustrates conversion of a simulated resonance frequency of a sensor to a closest notch frequency that substantially cancels the resonance frequency of 60 kHZ as output of the notch.

Figure 9:
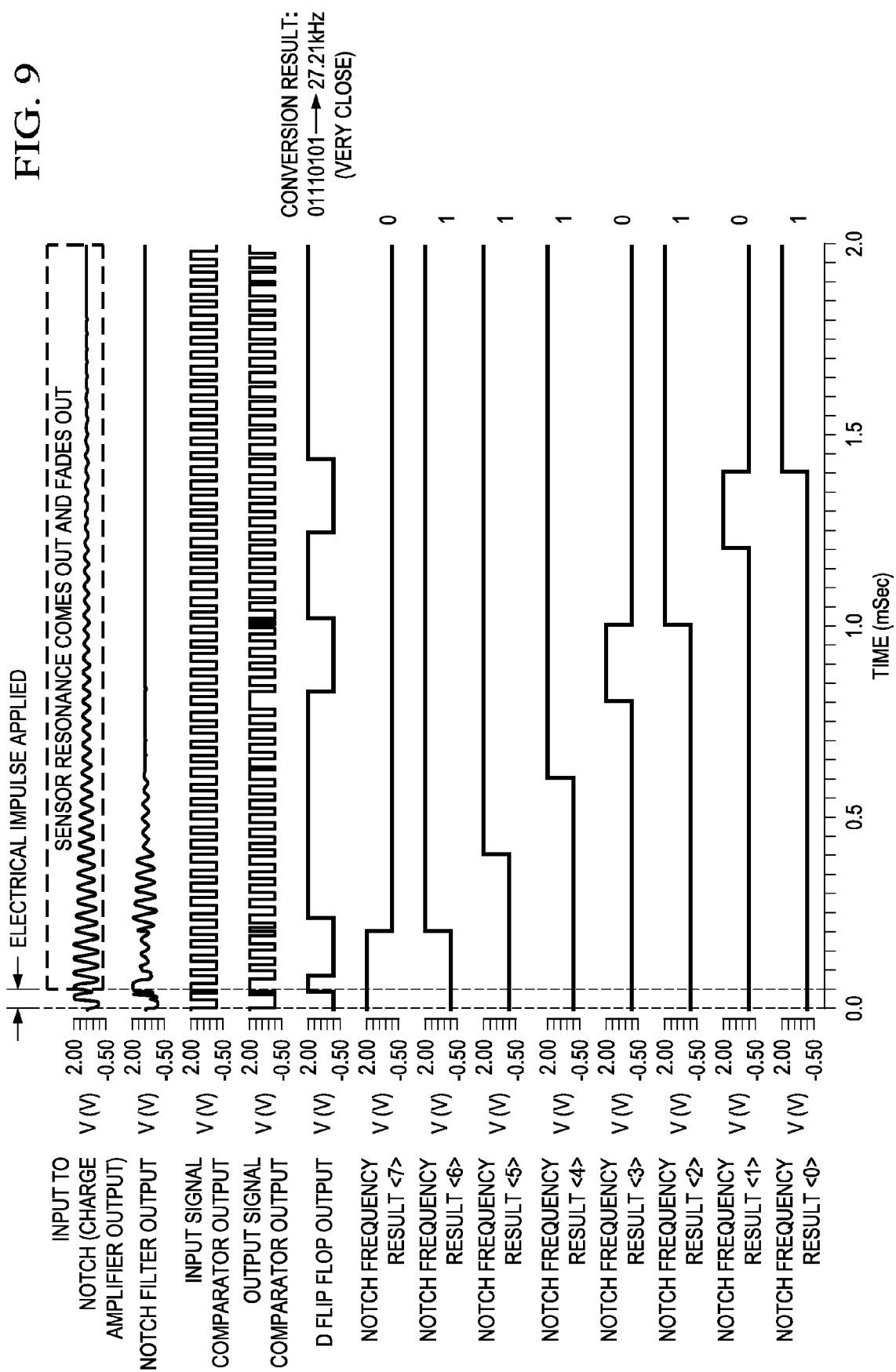
FIG. 9 illustrates a conversion of a resonance frequency which is generated by an "Electrical Impulse" approach.

FIG. 9 illustrates an application of impulse frequencies that are used to simulate conversion of a simulated resonance frequency of a sensor to a closest notch frequency that substantially cancels the resonance frequency of 27 kHz as output of the notch filter of FIG. 5.

FIG. 9 illustrates a conversion of a resonance frequency which is generated by an Electrical Impulse method. The simulation also contains the sensor model, so once an electrical impulse is applied, the model output resonance frequency of 27 k Hz.

A difference between FIG. 9 and FIG. 8Ai (or 8B/8C) is the input signal sources. FIG. 8Ai input signal is a voltage source which has a unique frequency and same amplitude throughout the conversion. FIG. 9, the signal source is a shock sensor unit. Once the shock sensor is stimulated by the electrical impulse method, it starts outputting the resonance frequency. The impulse method is applied onto the sensor at the very beginning of the simulation, which is texted as 'Electrical Impulse applied', and this is where Toga's patent is used. The resonance frequency on this sensor model has 27 kHz. The resonance signal then gradually decays to settle back to steady state (no signal). This is why on FIG. 9 inputs are getting smaller as the time passes, while 8Ai signal keeps the same amplitude throughout the calibration.

Figure 10:
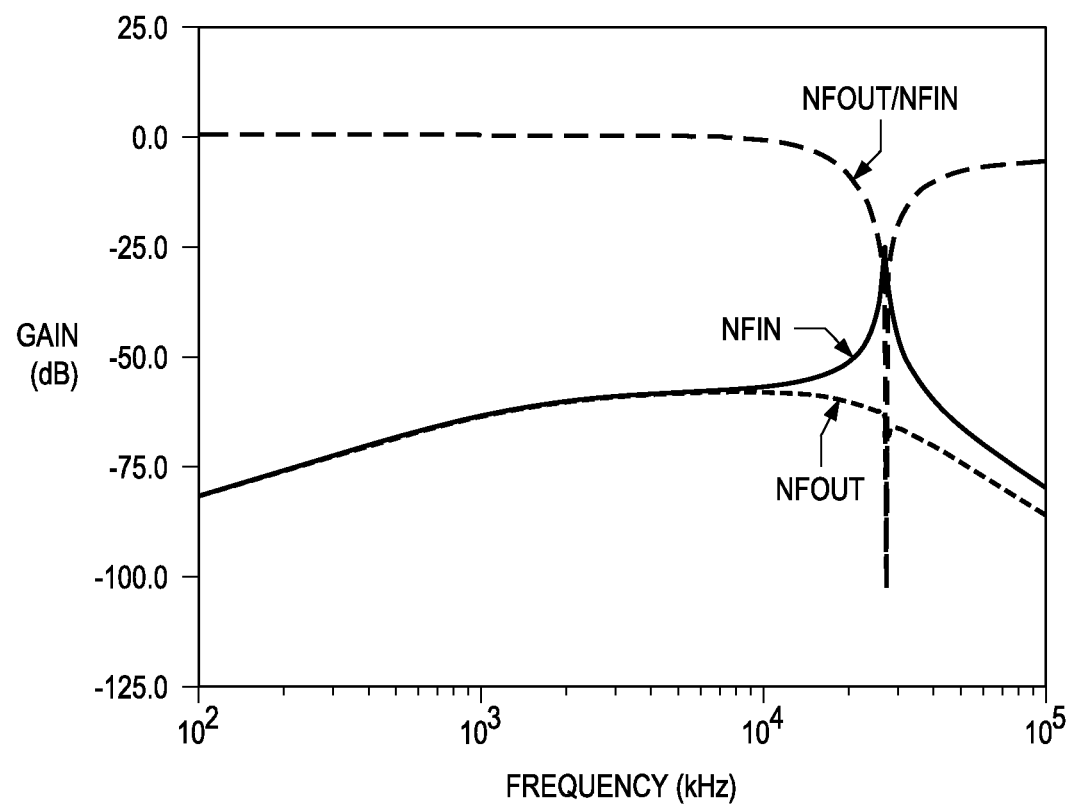
FIG. 10 illustrates a simulated substantial cancellation between a resonance frequency of a shock sensor of a HDD and its correlated notch filter.

FIG. 10 illustrates how a notch filter output as calibrated by an example circuit 500 or system 600 can be used to substantially eliminate a resonance frequency of a shock sensor in an HDD system. Substantially is when a circuit designer or technician would recognize that a cancellation would be "good enough" for a given design criteria.

Example uses can be, for example: 1. Substantial cancellation of a mechanical vibration of an actuator 2. Howling reduction on an audio system (microphone—speaker loop) 3. Substantial cancellation of an oscillation signal from known or unknown signal source. 4. Rejection of a carrier frequency 5. Hum noise reduction. However, other implementations can allow for other areas of substantial cancellations.

One possible usage of the sensor in HDD system is sensing rotational vibration. This vibration is sensed and fed forward to VCM (Voice Coil Motor) to tune MR head on track.

Another possible usage of the sensor in HDD system is sensing the shock and set the system into safe state (positioning) to save from damaged. Another possible usage of the sensor is in ODD (Optical Disk Drive), which shock is sensed and fed forward to the actuator for correct focus tracking.

Those skilled in the art to which this application relates will appreciate that other and further additions, deletions, substitutions and modifications may be made to the described embodiments.

What is claimed is:

1. An apparatus for use with a hard disk drive, comprising:
a selectable notch filter with a selectable notch frequency;
a shock sensor of the hard disk drive, coupled to the selectable notch filter, the shock sensor having at least one resonance frequency;
a flip flop coupled to an output of the notch filter and an output of the shock sensor; and
a calibration logic coupled to an output of the flip flop, wherein an output of the calibration logic is coupled to a selection input of the selectable notch filter,
wherein the selectable notch filter is programmed by the calibration logic to have a notch frequency that substantially cancels the at least one resonance frequency of the shock sensor of the hard drive,
wherein an output phase of the selectable notch filter is compared to an input phase of the input notch filter to determine the at least one resonant frequency of the selectable notch filter to be cancelled.

2. The apparatus of claim 1, wherein the selectable notch filter is less than fourth order.

3. The apparatus of claim 1, wherein an output of the notch filter is either delayed or proceeded, and this output by the flip flop as triggered by an output of the shock sensor as received at a clock input of the flip flop.

4. The apparatus of claim 1, further comprising an amplifier and a comparator coupled to an input of the selectable notch filter and a clock signal input of the flip flop, and an amplifier and a comparator coupled to an output of the selectable notch filter and a sample input of the flip flop.

5. The apparatus of claim 1, wherein the flip flop is a D flip flop.

6. The apparatus of claim 1, further comprising wherein the calibration logic is configured to employ a binary scheme to program the selectable notch filter.

7. The apparatus of claim 1, further comprising wherein a shock sensor employs an electronic charge signal that is amplified before being conveyed to the notch filter.

8. A system for use with a hard disk drive, comprising:
a digital selectable notch filter with a selectable notch frequency;
a shock sensor of the hard disk drive, coupled to the digital selectable notch filter, the shock sensor having at least one resonance frequency;
a triggerable memory element coupled to an output of the notch filter and an output of the shock sensor;
a calibration logic coupled to an output of the flip flop, wherein an output of the calibration logic is coupled to a selection input of the selectable notch filter,
wherein the apparatus is configured to converge upon a digital value of the digital selectable notch filter that substantially filters out the at least one resonance frequency of the shock sensor,
wherein an output phase of the digital selectable notch filter is compared to an input phase of the input notch filter to determine the at least one resonant frequency of the selectable notch filter to be cancelled.

9. The system of claim 8, wherein an output of the notch filter is either delayed or proceeded, and this output by the triggerable memory element as triggered by an output of the shock sensor as received at a clock input of the triggerable memory element.

10. The system of claim 8, further comprising an amplifier and a comparator coupled to an input of the selectable notch filter and a clock signal input of the triggerable memory element, and an amplifier and a comparator coupled to an output of the selectable notch filter and a sample input of the triggerable memory element.

11. The system of claim 8, wherein the triggerable memory element is a D flip flop.

12. The system of claim 8, further comprising wherein the calibration logic is configured to employ a binary scheme to program the selectable notch filter.

13. A method, comprising:
generating a resonant frequency of a shock sensor of a hard disk drive;
setting an N bit notch frequency value all to a given value;
setting an index number to zero;
setting a most significant bit minus the index number to a value opposite of the given value;
determining if a D flip flop outputs a one value, if not, resetting the most significant bit minus the index number to zero, wherein the output represents delay or a procession of a phase of an output of the N bit notch filter, when compared to the generated resonant frequency value of the shock sensor used as a clock signal to the D flip flop, incrementing the index number; and
determining whether all elements of the N bit notch frequency filter have been set, if not setting the MSB minus the incremented index number to one,
wherein the N bit notch filter is programmed by the calibration logic to have a notch frequency that substantially cancels at least one resonance frequency of the shock sensor of the hard drive,
wherein an output phase of the N bit notch filter is compared to an input phase of the input notch filter to determine the at least one resonant frequency of the N bit notch filter to be cancelled.

14. The method of claim 13, wherein the selectable notch filter is digital.

15. The method of claim 13, wherein an output of the notch filter is either delayed or preceded, and this output by the flip flop as triggered by an output of the shock sensor as received at a clock input of the flip flop.

16. The method of claim 13, further comprising an amplifier and a comparator coupled to an input of the selectable notch filter and a clk input of the flip flop, and an amplifier and a comparator coupled to an output of the selectable notch filter and a sample input of the flip flop.

17. The method of claim 13, further comprising wherein the selectable notch filter is programmed to have a notch frequency that substantially cancels the resonance frequency of the shock sensor of the hard drive.

18. The method of claim 13, wherein the resonant frequency is generated by an impulse circuit.

19. The method of claim 13, wherein a second clock signal is used in conjunction with an output of the D Flip flop to program the N selectable notch filter.

20. The method of claim 13, wherein the given value is the value of "0."

* * * * *